Oct. 24, 1939.   J. C. WILSON   2,177,162
PERIODIC SAW TOOTH WAVE REPEATER
Filed Jan. 14, 1939
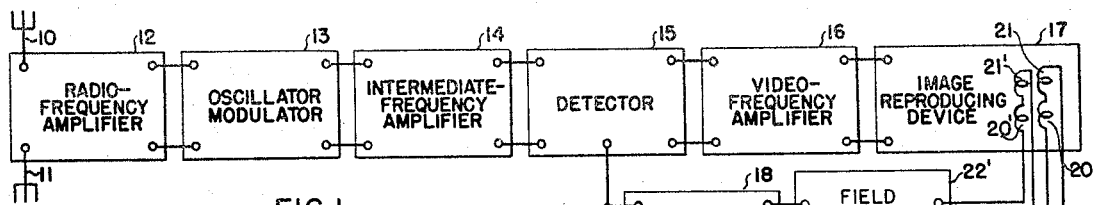
FIG.1.
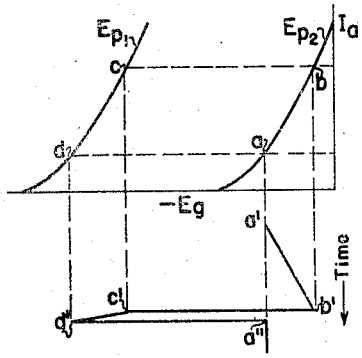
FIG.2.
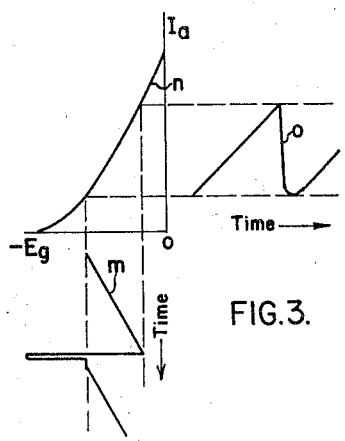
FIG.3.
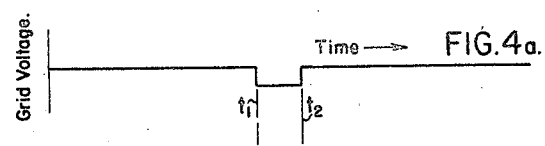
FIG.4a.
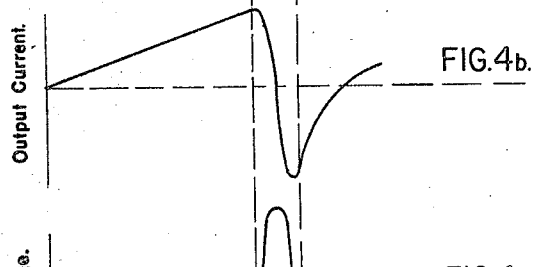
FIG.4b.
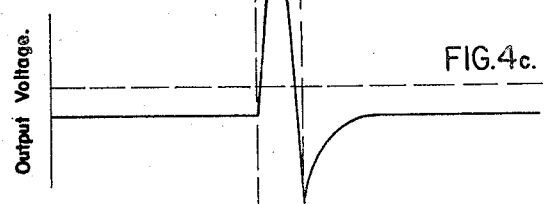
FIG.4c.
FIG.5a.
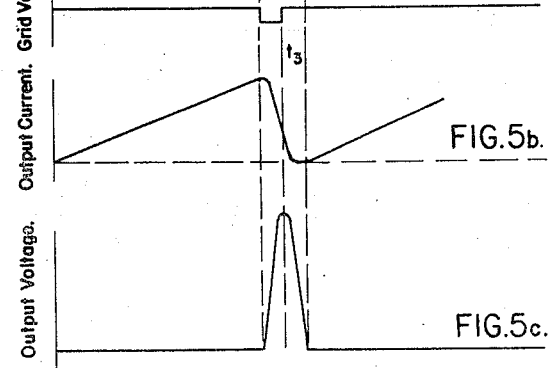
FIG.5b.
FIG.5c.
INVENTOR
JOHN C. WILSON
BY Laurence B Dodds
ATTORNEY Patented Oct. 24, 1939

2,177,162

UNITED STATES PATENT OFFICE 2,177,162

PERIODIC SAW TOOTH WAVE REPEATER

John C. Wilson, Bayside, N. Y., assignor to Hazeltine Corporation, a corporation of Delaware Application January 14, 1939, Serial No. 250,915

5 Claims. (Cl. 250—36)

This invention relates to periodic-wave repeaters and, while of general application, the invention is of particular utility in producing scanning fields of saw-tooth wave form for television signal-translating apparatus.

In many electrical installations it is desirable to produce an electric field of saw-tooth wave form. An example of the use of such a field is in the scanning system of a television signal-translating apparatus such as a transmitter signal-generating tube or a receiver signal-reproducing tube. A field of the type under discussion is customarily produced by applying periodic waves of a predetermined wave form to a vacuum tube having an output circuit in which is included a field-producing reactance element. A current or voltage of predetermined wave form is thus required from the tube in order to provide a scanning field of the desired wave form. Thus, to provide a saw-tooth current through an inductor to procure an electromagnetic scanning field, it is customary to apply periodic current input pulses of substantially rectangular wave form to the input circuit of the vacuum-tube repeater. Integrating means comprising shunt capacitance is included in the input circuit to provide a saw-tooth voltage on the grid, thus to procure the desired saw-tooth output current.

Many of such systems of the prior art utilize triode tubes for the reason that the tube impedance is such as effectively to damp the output circuit of the tube during the retrace interval. In a circuit utilizing a triode, however, the control of the output current of the tube by potential changes at the input electrodes of the tube is affected by changes of potential at the output electrodes, particularly in such systems in which the inductive reactance in the output circuit of the tube is comparable in magnitude to the internal reactance of the triode. For this reason, counter electromotive forces induced in the output circuit affect the operation of the tube in such manner that it is necessary to apply a negative voltage pulse, in addition to the saw-tooth voltage, to the input electrodes of the tube during the retrace interval. The negative pulse so applied must be so related to the general arrangement as to provide a current of the desired wave form in the output circuit. If the negative pulse is not of sufficient magnitude, the current in the output circuit is not reduced to its proper value at the beginning of each successive trace interval. If the negative pulse is of greater magnitude than needed, a current pulse appears in the output circuit of the tube during the trace interval which impairs its linearity. It is undesirable that the input wave must be maintained at a given amplitude level during the retrace interval.

The operation of other types of tubes, such as pentodes, is substantially unaffected by potential changes at the output electrodes and some prior art systems have utilized a pentode together with a voltage input of saw-tooth wave form. However, in such a system, the inductance which can be tolerated in the output circuit is much less than the desired value due to the fact that the internal impedance of the pentode is high and its damping effect is low and, therefore, its scanning effect is less than can be obtained under other conditions. For instance, pentode repeaters with larger inductance coils have been utilized and excited with a saw-tooth voltage plus a negative pulse during the retrace interval, that is, a saw-tooth plus pulse-input voltage, the arrangement then operating generally in the manner described above for an arrangement utilizing a triode together with a saw-tooth plus pulse-input voltage, but in such cases, the pentode has not been operated below its cut-off point during the trace interval. However, the internal impedance of a pentode is considerably greater than that of a triode of comparable dimensions and its conductance is insufficient to provide the necessary damping in the output circuit, even in installations of the last-mentioned type, rendering an additional damping resistor or a damping diode necessary. It is, therefore, desirable to provide a system in which the shape of the pulse applied during the retrace interval is not critical and in which no additional circuit elements are needed.

It is, therefore, an object of the invention to provide a vacuum-tube repeater for voltages or currents of saw-tooth wave form which is not subject to the above-mentioned disadvantages.

It is a further object of the invention to provide a vacuum-tube repeater for currents or voltages of saw-tooth wave form having a relatively long trace and a relatively short retrace in which the shape of the pulse during the greater portion of the retrace interval is not critical.

In accordance with the invention, a repeater for translating periodic currents or voltages of saw-tooth wave form having a relatively long trace and a relatively short retrace interval comprises a vacuum tube having input and output electrodes together with a reactive output circuit coupled to the output electrodes. The vacuum tube utilized is one in which the control of the output current by potential changes at the input electrodes of the tube is relatively unaffected by potential changes at the output electrodes of the tube. The conventional pentode tube, among others, has this type of characteristic. Means are provided for applying to the input electrodes of the tube periodic current or voltage pulses to produce the desired output from the tube during the trace interval, the pulses being such as to bias the tube to cutoff during at least the initial portion of the retrace interval.

In the preferred embodiment of the invention, an inductance is coupled to the output electrodes of the tube through which it is desired to provide a saw-tooth scanning current. Also, in the preferred embodiment of the invention, the current through the inductance varies during the trace intervals between predetermined lower and upper limits and the pulses applied to the input circuit of the tube during the retrace intervals are such as to cut off the tube during the initial portion of each retrace interval and to establish the desired minimum value of current through the inductance at the beginning of each trace interval.

The present invention constitutes a modification of that disclosed and broadly claimed in an application of Harold A. Wheeler, Serial No. 238,757, filed November 4, 1938, and assigned to the same assignee as the instant application, comprising a periodic wave generator for producing a magnetic field of saw-tooth wave form having relatively long trace and relatively short retrace periods comprising a vacuum-tube repeater having input and output circuits, inductance means in the output circuit for producing the magnetic field, the output circuit having shunt capacitance effectively included therein, and means coupled to one of the circuits for causing the current to the output circuit to assume during only a part of the retrace period one extreme value such as to cause the rapid change of voltage required across the shunt capacitance. The invention of the above-referred to Wheeler application forms no part of the invention claimed in the present application.

For a better understanding of the invention, together with other and further objects thereof, reference is had to the following description taken in connection with the accompanying drawing and its scope will be pointed out in the appended claims.

Fig. 1 of the drawing is a circuit diagram, partially schematic, of a complete television receiver of the superheterodyne type embodying a periodic-wave repeater in accordance with the invention; while Figs. 2, 3, and 4a to 5c, inclusive, are characteristic curves utilized to explain the performance of the circuit of Fig. 1.

Referring now more particularly to the drawing, the system illustrated comprises a receiver of the superheterodyne type including an antenna system 10, 11 connected to a radio-frequency amplifier 12, to which is connected in cascade, in the order named, an oscillator-modulator 13, an intermediate-frequency amplifier 14, a detector 15, a video-frequency amplifier 16, and an image-reproducing device 17. A line-frequency generator 18 and a field-frequency generator 19 are coupled to the output circuit of the detector 15, the field-frequency generator 19 and the line-frequency generator 18 being coupled to the field-deflecting coils 20, 21 and 20', 21' of the image-reproducing device 17 through similar repeaters 22 and 22', respectively, presently to be described. The stages or units 10 to 19, inclusive, may all be of conventional well-known construction so that detailed illustration and description thereof are deemed unnecessary herein.

Referring briefly, however, to the operation of the system described above, television signals intercepted by antenna circuit 10, 11 are selected and amplified in radio-frequency amplifier 12 and coupled to the oscillator-modulator 13 wherein they are converted into intermediate-frequency signals which, in turn, are selectively amplified in the intermediate-frequency amplifier 14 and delivered to the detector 15. The modulation components of the signal are derived by the detector 15 and are supplied to the video-frequency amplifier 16 wherein they are amplified and from which they are supplied in the usual manner to a brilliancy-control electrode of the image-reproducing device 17 and to the synchronizing control elements of the generators 18 and 19. The intensity of the scanning ray of the device 17 is thus modulated or controlled in accordance with the video-frequency voltages impressed upon the control electrode in the usual manner. Scanning waves are generated in the line-frequency and field-frequency generators 18 and 19, which are controlled by synchronizing voltage pulses supplied from detector 15, and applied to the scanning elements of the image-reproducing device 17 to produce electric scanning fields, thereby to deflect the scanning ray in two directions normal to each other so as to trace a rectilinear scanning pattern on the screen and thereby reconstruct the transmitted image.

Referring now more particularly to the portion of the system of Fig. 1 embodying the present invention, there is provided a vacuum-tube repeater 22 for translating the output of the line-frequency generator 19 to the deflecting coils 20, 21 of the image-reproducing device 17. This repeater comprises a vacuum tube 25 having input and output electrodes, the vacuum tube being of a type such that the output current of the tube produced by potential variations of its input electrodes is relatively unaffected by variations of potential of the output electrode of the tube, for example, a pentode tube connected in a conventional manner.

The line-frequency generator 19 is effective to develop and supply to the input electrodes of tube 25 a particular type of pulse in order to provide a system in which the disadvantages of prior art systems mentioned above are effectively eliminated. In order to explain in more detail the type of pulse which is developed and applied to the input electrodes of tube 25 and the particular advantages which are obtained by utilizing this type of pulse with a tube of the pentode type, reference is made to Fig. 2 which is utilized to explain a corresponding operation in a circuit comprising a triode tube, such as that used in certain of the prior art circuits. In a triode tube, the potential of the anode materially affects the operation of the tube and it is customary in saw-tooth wave repeaters, having an inductive reactance in the output circuit of the tube of a magnitude comparable to the internal resistance of the triode, to apply to the input electrodes of the triode a saw-tooth voltage plus a negative pulse during the retrace interval.

In Fig. 2, there is shown the operating cycle of such a tube, the negative voltage on the grid of the tube is shown as the abscissa and the output current $I_a$ is shown as the ordinate. If a saw-tooth voltage is applied to the grid during the trace interval as indicated by the curve $a', b'$, the tube operates over the tube characteristic $E_{p2}$, representing a characteristic of the tube for a given anode voltage. When the grid voltage is instantaneously changed to a highly negative value by the application of the negative pulse during the retrace period, as indicated by curve $b', c'$, the anode voltage of the tube changes in such manner that the tube operates over a different characteristic, represented by $E_{p1}$. The anode current thus decreases during the retrace interval along the curve $c, d$ as the grid voltage varies as indicated by the curve $c', d'$. The grid voltage then suddenly decreases to the value $a''$ which is identical in magnitude with the starting grid voltage $a'$. It thus appears that it is difficult or impossible to drive a tube of the triode type beyond cutoff under such conditions.

In a circuit of the type of that shown in Fig. 1, however, it is entirely practical to operate the tube 25 beyond cutoff during the retrace interval by the application of a negative pulse of moderate amplitude during the retrace interval in addition to the normal saw-tooth voltage input. The reason for this is that, during its operating cycle, a pentode tube effectively operates over a single grid-voltage plate-current characteristic as shown by Fig. 3. The proper grid voltage to be applied to the input electrodes of tube 25 is represented by curve $m$ while the resulting output current of the tube is illustrated by curve $o$. As brought out above, it is usually necessary, when a pentode tube is used in a circuit of the type under discussion, to provide additional damping elements for satisfactory operation.

In accordance with the present invention, the pentode tube is cut off for only a portion of the retrace interval and is again cut on during a remaining portion of the retrace interval in order to increase the damping of the output circuit during the final portion of the retrace interval and return the output current to the desired value at the beginning of the trace interval. The inertia effects of the inductance and distributed capacitance, represented by dotted condenser 21', in the output circuit of vacuum tube 25 tend to produce a predetermined oscillatory variation of the output current of the tube during the retrace interval while the effect of cutting the tube on during the final portion of the retrace interval is to oppose this oscillatory current in the inductance. In accordance with the invention, these two effects are so balanced that the current in the output circuit is returned to the proper value at the beginning of the trace interval.

In order to show the effect of cutting the tube on when there is a tendency towards oscillation in the output circuit, reference is made to the curves of Figs. 4a to 5c, inclusive. Fig. 4a illustrates a negative pulse which may be applied to the input electrodes of tube 25 during the entire retrace interval to operate the tube to cutoff. The current through the coils 20, 21 is then as illustrated by Fig. 4b and falls from the instant $t_1$, when the tube is cut off, through zero to a negative value at the time $t_2$, when the tube is again cut on. The voltage across the output electrodes of the tube is illustrated by the curve of Fig. 4c from which it is seen that it reaches a maximum at the instant that the current is zero and continues to fall to a minimum value at the time $t_2$, when the tube is again cut on. It is thus apparent from the curves of Figs. 4a to 4c, inclusive, that the pulse of Fig. 4a is applied over too great a portion of the retrace time because the current is not at the desired value at the time $t_2$, which is the beginning of the succeeding trace interval.

The effect of shortening the duration of the pulse is shown in Figs. 5a to 5c, inclusive. Fig. 5a represents a negative pulse which is applied to cut off the tube 25 while Fig. 5b represents the current in the output circuit of the tube. It will be seen that, while the output current is falling at time $t_3$, the tube 25 is again cut on tending to build up the current through the inductance of the load circuit. As a result, the current through the inductance continues to fall but falls at a decreasing rate. The duration of the negative-grid pulse of Fig. 5a is so chosen that, at the time $t_2$, beginning the succeeding trace interval, the current is at the desired value. The voltage across the output electrodes of tube 25 during the interval $t_1, t_2$ is shown by Fig. 5c.

It will thus be seen that, beginning at time $t_1$ the output voltage rises and continues to rise to a maximum value at time $t_3$ when the tube is again cut on and thereafter the output voltage decreases to its normal value at time $t_2$. It is, therefore, seen from Fig. 5b that the inertia effect of the current due to inductances 20, 21 is compensated by the tendency of tube 25 to pass current at time $t_2$ and that these two effects are proportioned over the interval between the times $t_3$ and $t_2$ so that the required output current is present in the tube at the time $t_2$, which is the beginning of the succeeding trace interval.

It will be understood that the pulses illustrated in Fig. 4a and Fig. 5a are utilized only as markers to indicate time intervals during the retrace period and do not represent the actual grid voltage which is of the saw-tooth plus pulse type.

Since the internal impedance of a pentode, even when conductive, is high, there may be a tendency for the current as shown in Fig. 5b to rise after reaching the minimum value at the time $t_2$ more sharply than the saw-tooth input voltage demands, that is, a transient may be introduced at the beginning of the succeeding trace interval. This would be accompanied by a fall of the anode voltage below its normal level. To combat this, a diode may be connected across the output circuit of tube 25, the cathode of the diode being connected to the anode of the pentode 25. This diode is similar to the so-called "efficiency diode" sometimes used in saw-tooth wave-form repeater circuits but functions in this case rather as a pure surge absorber.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A repeater for translating periodic pulses of saw-tooth wave form having a relatively long trace and a relatively short retrace interval comprising, a vacuum tube having input and output electrodes, a reactive output circuit coupled to said output electrodes, said tube having an input-electrode voltage-output-electrode current characteristic substantially independent of output-electrode voltage, and means for applying to said input electrodes a periodic-voltage wave to produce the desired output from said tube during said trace interval, said wave including pulses effective to bias said tube to cutoff during only the initial portion of said retrace interval.

2. A repeater for translating periodic pulses of saw-tooth wave form having a relatively long trace and a relatively short retrace interval comprising, a vacuum tube having input and output electrodes, an output circuit comprising an inductance coupled to said output electrodes, said tube having an input-electrode voltage-output-electrode current characteristic substantially independent of output-electrode voltage, and means for applying to said input electrodes a periodic-voltage wave to produce a saw-tooth current through said inductance during said trace interval, said wave including pulses effective to bias said tube to cutoff during only the initial portion of said retrace interval.

3. A repeater for translating periodic pulses of saw-tooth wave form having a relatively long trace and a relatively short retrace interval comprising, a vacuum tube having input and output electrodes, an output circuit comprising an inductance coupled to said output electrodes, said tube having an input-electrode voltage-output-electrode current characteristic substantially independent of output-electrode voltage, and means for applying to said input electrodes a periodic-voltage wave of saw-tooth plus pulse form to produce a saw-tooth current through said inductance during said trace interval, said wave including pulses effective to bias said tube to cutoff during only the initial portion of said trace interval.

4. A repeater for translating periodic pulses of saw-tooth wave form having a relatively long trace and a relatively short retrace interval comprising, a vacuum tube having input and output electrodes, an output circuit comprising an inductance coupled to said output electrodes, said tube having an input-electrode voltage-output-electrode current characteristic substantially independent of output-electrode voltage, and means for applying to said input electrodes a periodic-voltage wave to provide a saw-tooth current through said inductance varying between predetermined upper and lower limits during said trace interval, said wave including pulses effective to bias said tube to cutoff during only the initial portion of said retrace interval and to establish current of said lower limiting value through said inductance at the beginning of said trace interval.

5. A periodic repeater for translating periodic pulses of saw-tooth wave form having a relatively long trace and a relatively short retrace interval comprising, a pentode vacuum tube having input and output electrodes, a reactive circuit coupled to said output electrodes, and means for applying to said input electrodes a periodic-voltage wave to produce a desired output from said tube during said trace intervals, said wave including pulses effective to bias said tube to cutoff during only the initial portion of said retrace interval.

JOHN C. WILSON.